United States Patent
Lake et al.

(10) Patent No.: US 10,834,304 B2
(45) Date of Patent: Nov. 10, 2020

(54) SYSTEMS, DEVICES, AND METHODS FOR A WEARABLE ELECTRONIC DEVICE HAVING A SELFIE CAMERA

(71) Applicant: GOOGLE LLC, Mountain View, CA (US)

(72) Inventors: Stephen Lake, Kitchener (CA); Antonio Gomes, Lousã (PT); Gabriel Reyes, Dexter, MI (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/402,593

(22) Filed: May 3, 2019

(65) Prior Publication Data

US 2019/0356838 A1    Nov. 21, 2019

Related U.S. Application Data

(60) Provisional application No. 62/667,300, filed on May 4, 2018.

(51) Int. Cl.
*H04N 5/232* (2006.01)
*G02B 27/01* (2006.01)
*G06F 1/16* (2006.01)

(52) U.S. Cl.
CPC ....... *H04N 5/23203* (2013.01); *G02B 27/017* (2013.01); *G06F 1/163* (2013.01); *H04N 5/232933* (2018.08)

(58) Field of Classification Search
CPC ......... H04N 5/23203; H04N 5/232933; G02B 27/017; G02B 27/0172; G02B 2027/014; G02B 2027/0138; G06F 1/163; G06F 3/012; G06F 1/1686; G06F 1/169
See application file for complete search history.

(56) References Cited

U.S. PATENT DOCUMENTS

| | | | |
|---|---|---|---|
| D451,116 S * | 11/2001 | Kono | D10/31 |
| 9,335,790 B2 * | 5/2016 | Stotler | G06F 3/0421 |
| D761,685 S * | 7/2016 | Reaux | D11/26 |
| D779,994 S * | 2/2017 | Roberts | D11/3 |
| D779,995 S * | 2/2017 | Roberts | D11/3 |
| 9,582,034 B2 * | 2/2017 | von Badinski | A61B 5/02416 |

(Continued)

OTHER PUBLICATIONS

Radhika Seth, Ringing the Images, Oct. 3, 2012, Yanko Design, retrieved from https://www.yankodesign.com/2012/10/03/ringing-the-images/ on Feb. 20, 2020 (Year: 2012).*

*Primary Examiner* — Timothy J Henn

(57) ABSTRACT

Wearable electronic devices having a selfie camera are described herein. The wearable electronic devices include a body defining an aperture that is sized and shaped to receive a finger of a user. The wearable electronic device also includes a processor housed in the body, an input device arranged on an outer surface of the body and communicatively coupled to the processor to receive an input from a second finger of the user, an optical sensor to capture an image in response to the input from the second finger of the user, a transmitter communicatively coupled to the processor to transmit the image to an external electronic device, and optionally a power source communicatively coupled to the processor and the transmitter to provide power to at least the processor and the transmitter.

15 Claims, 7 Drawing Sheets

(56) References Cited

U.S. PATENT DOCUMENTS

| | | | | |
|---|---|---|---|---|
| 9,973,837 B2* | 5/2018 | Carroll | .................. | H04B 1/385 |
| 10,043,125 B2* | 8/2018 | Park | .................. | G06F 3/04883 |
| 10,281,953 B2* | 5/2019 | von Badinski | ....... | G06F 3/1423 |
| 10,528,780 B2* | 1/2020 | Lim | .................. | G06K 7/10722 |
| 2012/0293702 A1* | 11/2012 | Siulinski | .............. | G02B 27/017 |
| | | | | 348/333.09 |
| 2015/0277559 A1* | 10/2015 | Vescovi | .................. | G06F 21/31 |
| | | | | 345/173 |
| 2016/0077582 A1* | 3/2016 | Song | .................... | G06F 3/0338 |
| | | | | 345/173 |
| 2017/0083115 A1* | 3/2017 | Speck | ..................... | G06F 3/011 |
| 2018/0288333 A1* | 10/2018 | VanBlon | ............ | H04N 5/23293 |
| 2019/0155385 A1* | 5/2019 | Lim | ........................ | G06F 3/033 |
| 2019/0215544 A1* | 7/2019 | Hemmati | ......... | H04N 21/23424 |
| 2019/0332140 A1* | 10/2019 | Wang | ..................... | G06F 3/016 |

* cited by examiner

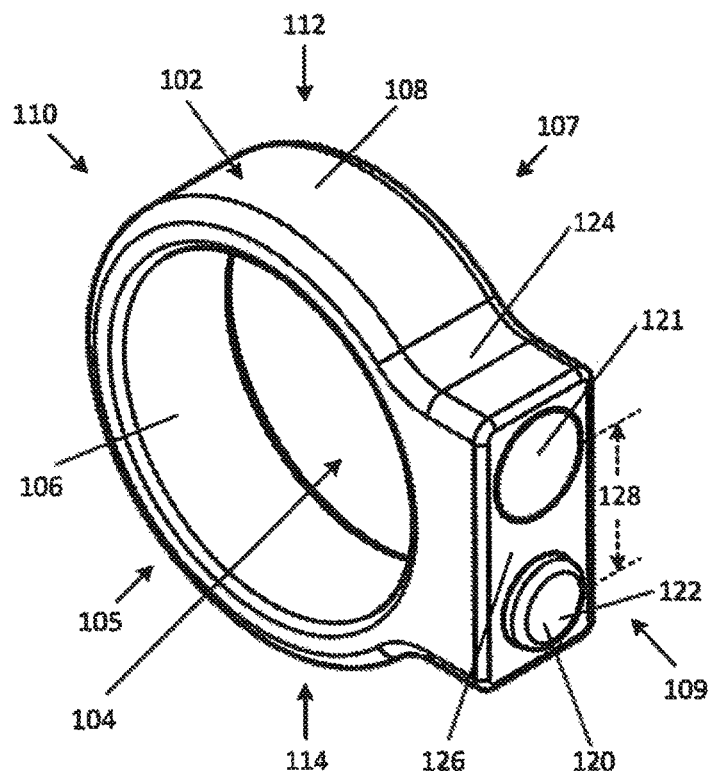
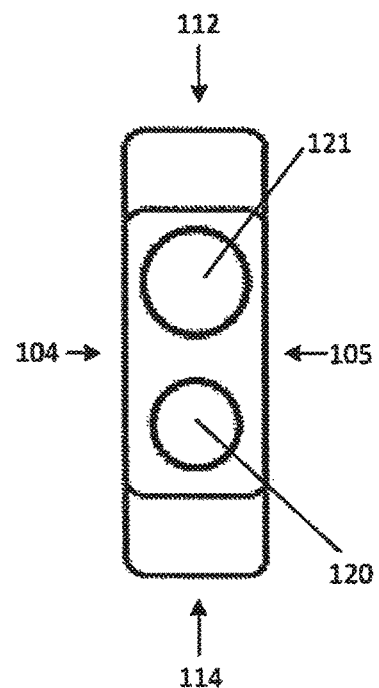
FIG. 1A
FIG. 1B
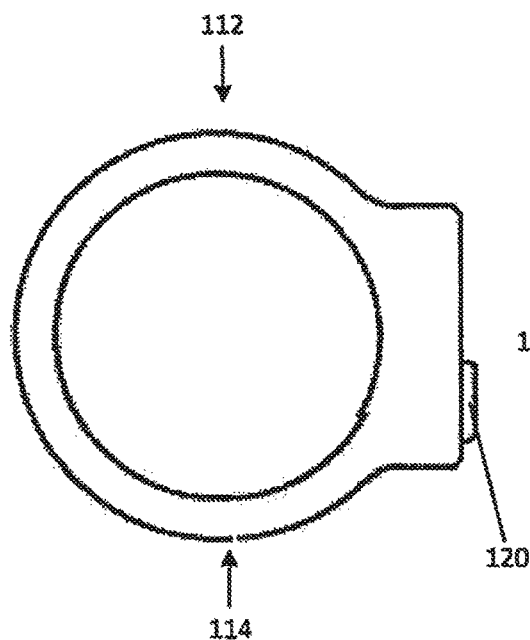
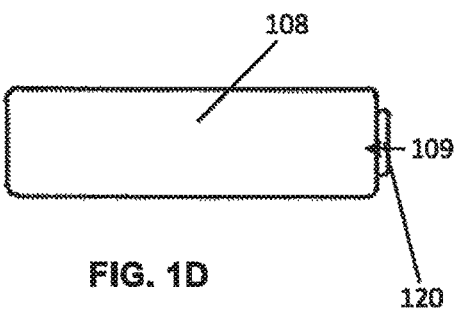
FIG. 1C
FIG. 1D

SYSTEMS, DEVICES, AND METHODS FOR A WEARABLE ELECTRONIC DEVICE HAVING A SELFIE CAMERA

BACKGROUND

Technical Field

The present systems, devices, and methods generally relate to wearable electronic devices and particularly relate to a wearable electronic device having a selfie camera.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

Selfies

A "selfie" is a photograph taken of oneself, by oneself. Other subjects may be present in the photograph as well but generally a selfie includes the photographer as a subject. Selfies have risen in popularity in tandem with the adoption of smartphones. In fact, many smartphones today include at least two cameras, one of which is specifically adapted for capturing selfies (i.e., a "selfie cam"). A smartphone is particularly well-suited for capturing selfies because it is lightweight, highly portable, easily held in one hand, easily oriented to face the user, and easily actuated by the one hand that holds it.

There are wearable electronic devices today that include cameras (such as Snap Spectacles™) and wearable heads-up display devices that include cameras as well (such as Google Glass™). A deficiency of many wearable electronic devices that include cameras (especially those wearable electronic devices that approximate an eyeglasses form factor, such as Snap Spectacles and Google Glass) is that the user is not able to take selfies while wearing and operating the device in its intended way. Indeed, while the user is wearing such a device, the user will be excluded from all of their photographs unless they capture their reflection from some surface in the image. There remains a need in the art for wearable electronic devices and/or systems that readily enable the user to capture selfie photographs.

BRIEF SUMMARY

A wearable electronic device wearable on a first finger of a user may be summarized as including: a body defining an aperture therethrough, the aperture sized and shaped to receive the first finger of the user; a processor housed in the body; an input device carried by an outer surface of the body and communicatively coupled to the processor, the input device to receive an input from a second finger of the user; an optical sensor carried by the outer surface of the body and communicatively coupled to the processor, the optical sensor to capture an image in response to the input from the second finger of the user; and a transmitter communicatively coupled to the processor, the transmitter to transmit the image to an external electronic device. The wearable electronic device may further include a power source communicatively coupled to the processor and the transmitter to provide power to at least the processor and the transmitter.

The body of the wearable electronic device may include a platform having a presentation surface to present the input device and the optical sensor to the user, wherein both the input device and the optical sensor are carried by the presentation surface of the platform.

The presentation surface of the wearable electronic device may be generally parallel to or coplanar with a plane tangent to the body of the wearable electronic device.

The platform of the wearable electronic device may extend radially outward from the aperture of the body.

The optical sensor of the wearable electronic device may be coplanar with the presentation surface.

The input device of the wearable electronic device may extend outward from the presentation surface and has an actuation surface that is parallel to the presentation surface.

The presentation surface of the wearable electronic device may comprise an edge that separates the presentation surface into an upper presentation portion and a lower presentation portion.

The optical sensor of the wearable electronic device may be carried by the upper presentation portion and the upper presentation portion may present the optical sensor to the user. The input device may be carried by the lower presentation portion and the lower presentation portion may present the input device to the user.

The lower presentation portion of the wearable electronic device may be angled at a non-zero angle relative to the upper presentation portion.

The upper presentation portion of the wearable electronic device may be sloped laterally towards a side of the body.

The upper presentation portion of the wearable electronic device may be carried by a protrusion that extends outward from the platform and the optical sensor may be carried by the protrusion.

The optical sensor of the wearable electronic device may extend beyond the input device.

The upper presentation portion of the wearable electronic device may be sloped laterally towards a side of the body.

The optical sensor of the wearable device may include an autofocus camera. When the wearable electronic device includes a power source, the power source may be communicatively coupled to the autofocus camera to provide power to the autofocus camera.

The transmitter of the wearable device may include a wireless transmitter to wirelessly transmit the image to the external electronic device.

The input device of the wearable device may be selected from a group consisting of: a button, a joystick, a capacitive touch sensor, a lever, and a dial.

The optical sensor of the wearable device may be positioned and oriented (e.g., on, within, along, or flush with the body of the wearable electronic device) to face the user when the input device is oriented to face the user.

The optical sensor of the wearable electronic device may be positioned and oriented (e.g., on, within, along, or flush with the body of the wearable electronic device) to face the user when the first finger at least partially extends transversely across a field of view of the user.

The wearable electronic device may also include an indicator carried by the body, the indicator to provide an indication when the optical sensor captures the image.

The indicator of the wearable electronic device may be communicatively coupled to the power source if the wearable electronic device includes a power source. The indicator may include at least one component selected from a group consisting of: a speaker, a light source, a sound generator and a haptic feedback device.

A wearable system may be summarized as including a wearable heads-up display to be worn on a head of a user, wherein the wearable heads-up display comprises at least one transparent display positioned in a field of view of the user when the wearable heads-up display is worn on the head of the user; a wireless receiver; and a processor communicatively coupled to both the at least one transparent display and the wireless receiver; and a wearable electronic ring to be worn on a first finger of the user, wherein the wearable electronic ring comprises an actuator positioned to be actuated by a second finger of the user when the wearable electronic ring is worn on the first finger of the user; an autofocus camera communicatively coupled to the actuator, the autofocus camera positioned and oriented (e.g., on, within, flush with, or along the wearable electronic ring) to capture a selfie image of the user in response to an actuation of the actuator by the second finger; and a wireless transmitter communicatively coupled to the autofocus camera.

The wearable electronic ring of the wearable system may also include a processor that mediates communicative coupling between the autofocus camera and the actuator and between the autofocus camera and the wireless transmitter, the processor to process the selfie image captured by the autofocus camera and cause the wireless transmitter to wirelessly transmit the selfie image to the wireless receiver of the wearable heads-up display.

The wearable heads-up display of the wearable system may also include a non-transitory processor-readable medium that stores processor-executable instructions that, when executed by the processor of the wearable heads-up display, cause the at least one transparent display to display the selfie image to the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 1A to 1D are perspective, front, side and top views, respectively, of a wearable electronic device with a camera, according to one embodiment;

DETAILED DESCRIPTION

Figure 2A:
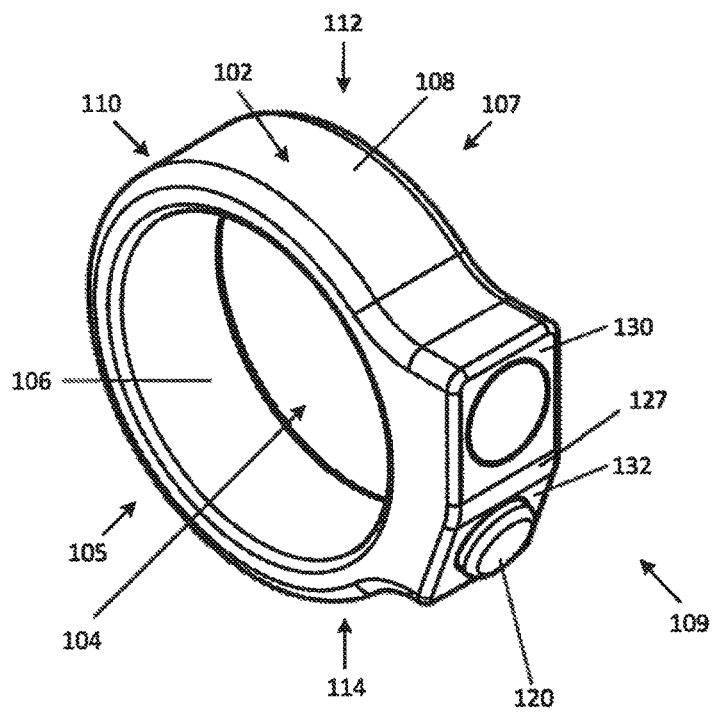
FIGS. 2A to 2D are perspective, front, side and top views respectively, of a wearable electronic device with a camera, according to one embodiment.
Figure 2B:
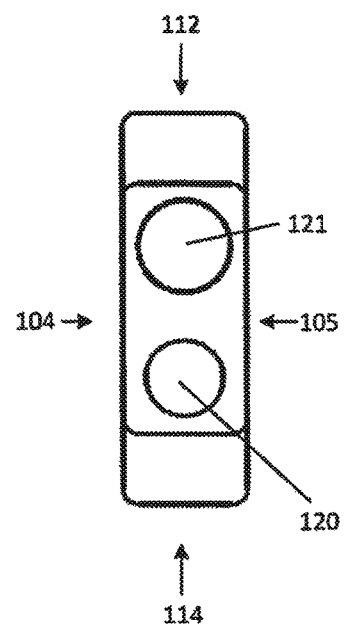
Figure 2C:
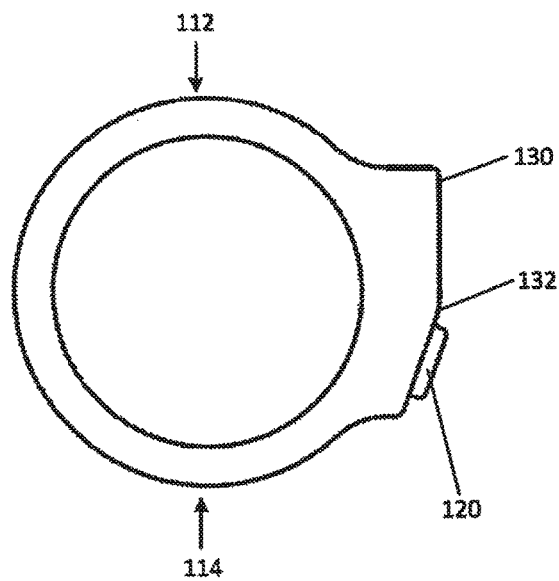
Figure 2D:
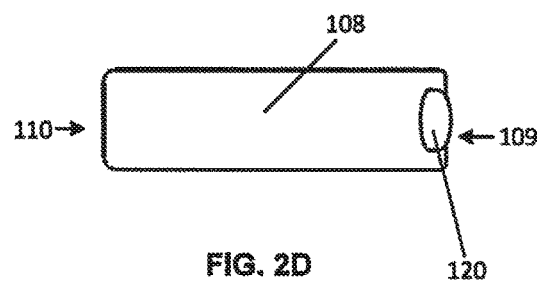
Figure 3A:
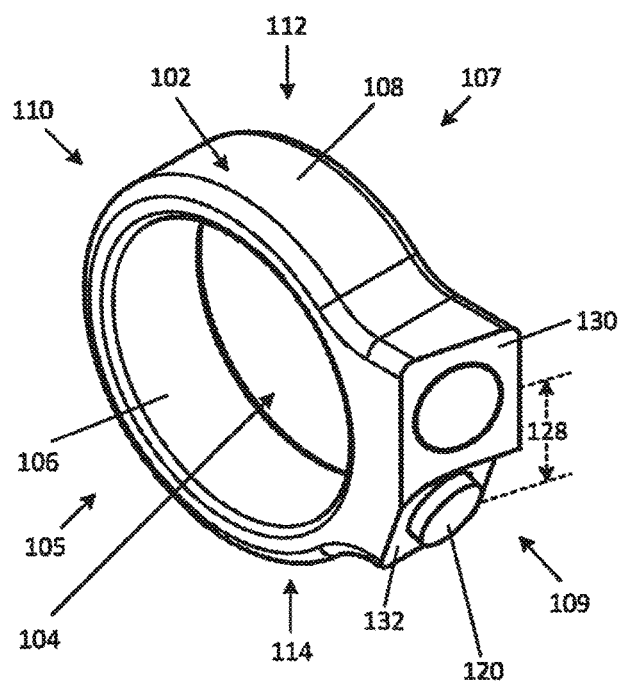
FIGS. 3A to 3E are perspective, front, side, top and bottom views, respectively, of a wearable electronic device with a camera, according to one embodiment.
Figure 3B:
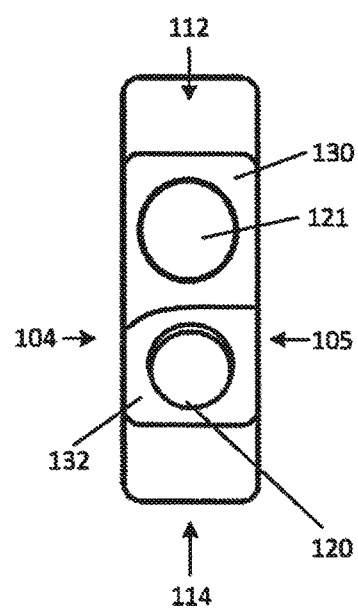
Figure 3C:
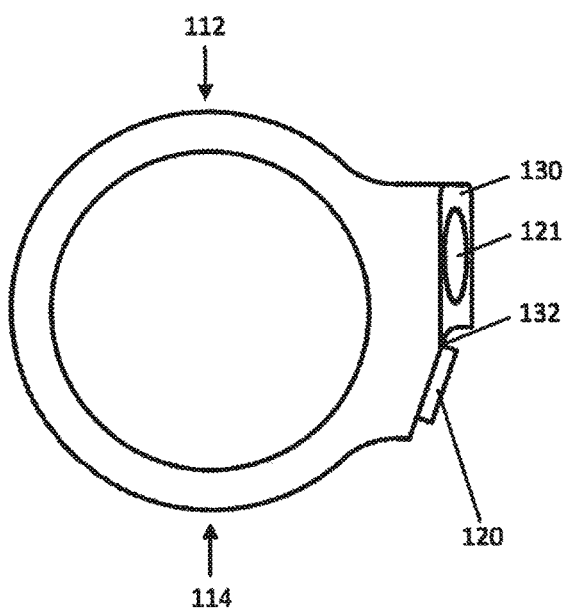
Figure 3D:
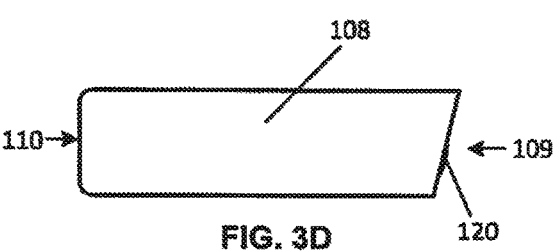
Figure 3E:
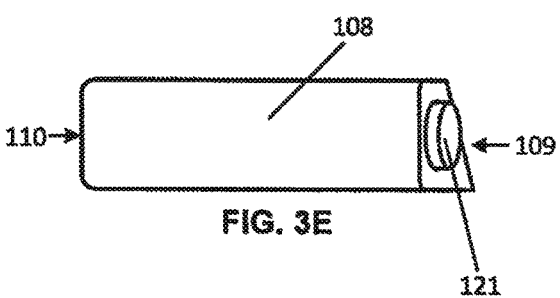
Figure 4A:
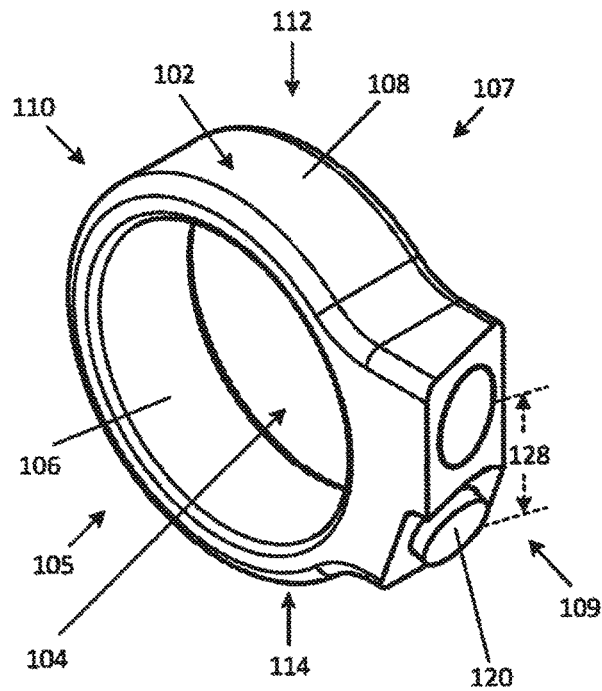
FIGS. 4A to 4E are perspective, front, side, top and bottom views, respectively, of a wearable electronic device with a camera, according to one embodiment.
Figure 4B:
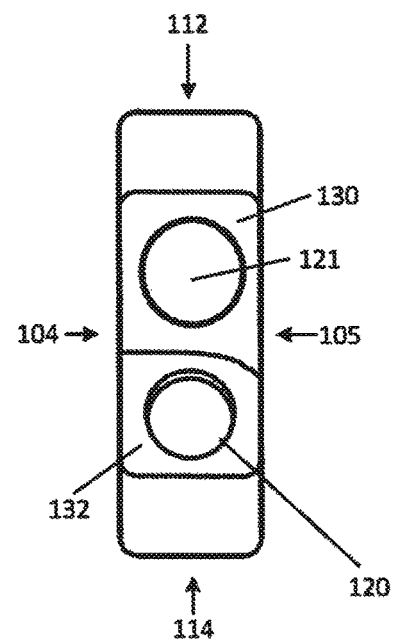
Figure 4C:
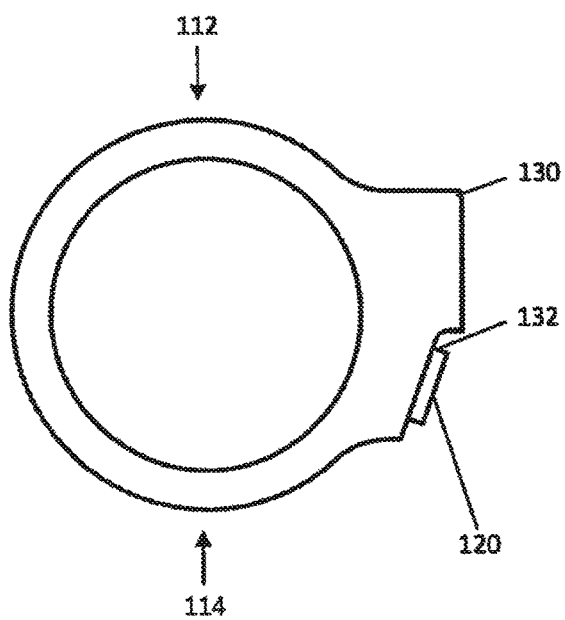
Figure 4D:
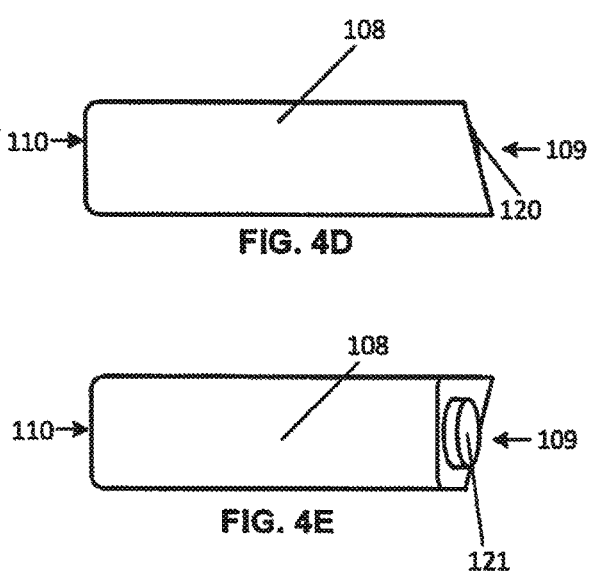
Figure 4E:
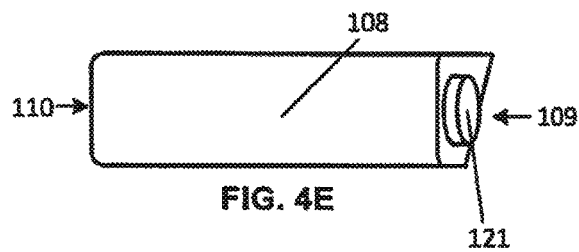
Figure 5A:
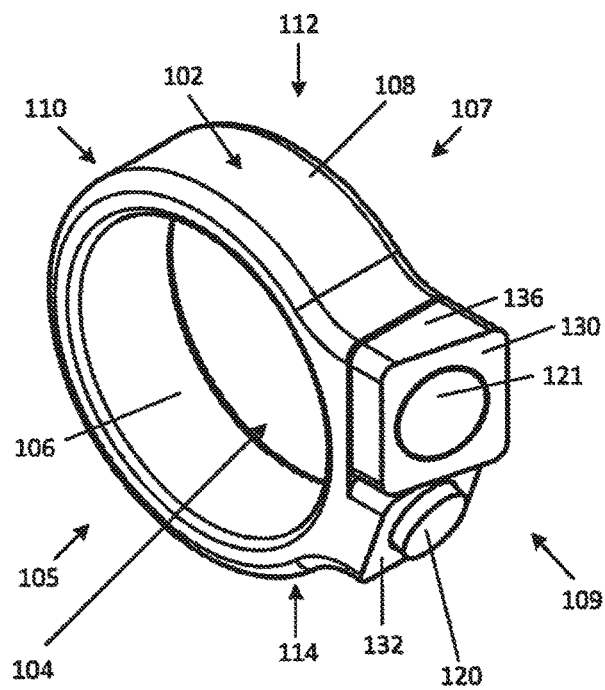
FIGS. 5A to 5E are perspective, front, side, top and bottom views, respectively, of a wearable electronic device with a camera, according to one embodiment.
Figure 5B:
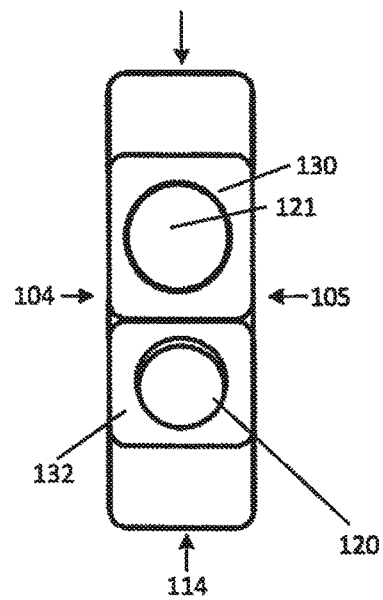
Figure 5C:
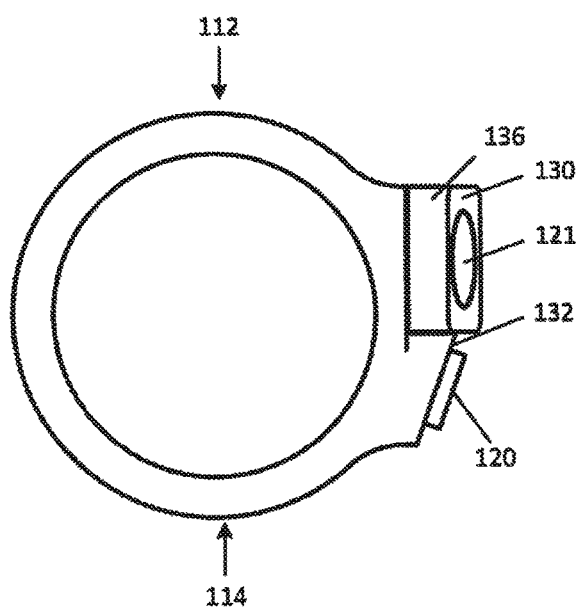
Figure 5D:
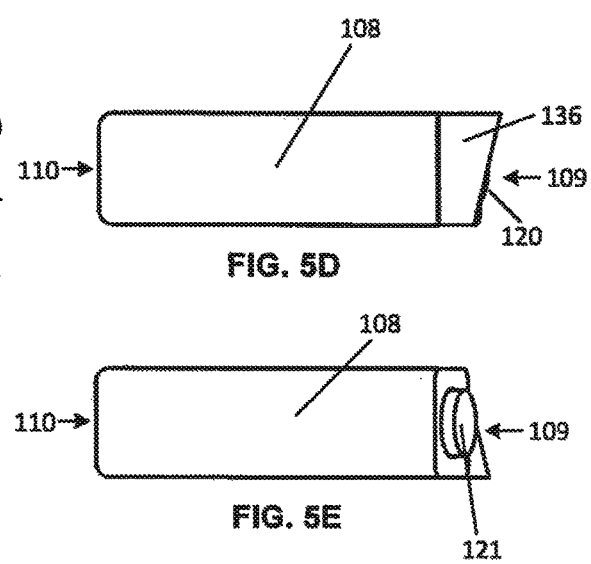
Figure 5E:
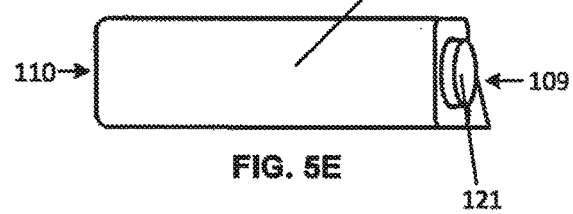

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The headings and Abstract of the Disclosure provided herein are for convenience only and do not interpret the scope or meaning of the embodiments.

Various embodiments described herein include a wearable electronic device that is configured to be worn on a first finger of a user. The wearable electronic device includes one or more input devices for capturing user input and/or for providing output to the user. Herein, the term "finger" means any finger of a user, including a thumb, an index finger, a middle finger, a ring finger, and a pinky finger of either hand of the user. In one or more implementations, the wearable electronic device is worn on the user's index finger.

The first wearable electronic device may communicate with one or more second wearable electronic devices via a communication channel, for instance a communication network, as further described below.

The first wearable electronic devices described herein have a camera. In one or more implementations, the first wearable electronic device can be configured so that the lens of the camera is easy to aim in a direction towards the user, for instance into a field of view of a user, and particularly easy to aim in a direction towards a face of the user, when the first wearable electronic device is worn on a finger of a user. The camera on the first wearable device may be triggered, for example, by an input device on the wearable device that is accessible by another finger of the user on the same hand as the finger that the wearable device is worn. For instance, the wearable device may be worn on a user's index finger or on a ring finger and the input device may be accessible to the user's thumb. In this manner, the user may easily take a picture of his or herself by holding their hand with the wearable electronic device in front of their face, aiming the camera towards their face and actuating the input device.

The wearable electronic device may employ a button, a joystick, a capacitive touch sensor, a lever, a dial, a microphone, or motion sensors as a user input device to capture user input via touches, audio commands, or hand gestures.

Referring to FIGS. 1A to 1D, illustrated therein are perspective, front, side and top views, respectively, of a wearable electronic device 100 having a camera. Wearable electronic device 100 has a body 102 having an input device 120 and an optical sensor 121. In one or more implementations, body 102 may have a general shape of a circular band (open or closed) and house one or more electronic components (such as but not limited to a processor, memory, sensors, a charging member, etc., as further described below). Body 102 may also have a general shape of a helix, or a spiral. With a helix or spiral shape, the wearable electronic device 100 can have one or more turns. The wearable electronic device 100 can also have a break. With a break in the wearable electronic device 100, the wearable electronic device 100 may expand to accommodate or tolerate fingers having different ring sizes. Some example systems and devices that may be included in the electronic ring 120 are described in U.S. Provisional Patent Application Ser. No. 62/607,819, U.S. Non-Provisional patent application Ser. No. 16/226,319, U.S. Non-Provisional patent application Ser. No. 16/226,326, U.S. Non-Provisional patent application Ser. No. 16/226,330, U.S. Non-Provisional patent application Ser. No. 16/226,422, U.S. Non-Provisional patent application Ser. No. 16/226,426, U.S. Provisional Patent Application Ser. No. 62/608,463, and U.S. Non-Provisional patent application Ser. No. 16/227,347.

Body 102 defines an aperture 104 capable of receiving a user's finger. Body 102 has a first side 105, a second side 107 opposed to the first side 105, a first end 109 and a second end 110 opposed to the first end 109, and a top portion 112 and a bottom 114 portion opposed to the top portion 112.

Body 102 generally has an annular shape and includes an inner surface 106 and an outer surface 108. The inner surface 106 is sized and/or shaped to conform to the finger of the user. The inner surface 106 thereby rests against the user's finger when the device 100 is worn by the user. Wearable electronic device 100 may be available in a variety of sizes for accommodating various finger sizes and/or various types of fingers.

In one or more implementations, the body 102 is made from a rigid or semi-rigid material such as a metal or a plastic. For instance, the body 102 may be made of gold, silver, platinum, or any other appropriate metal.

In the embodiment shown in FIGS. 1A to 1D, outer surface 108 has a user input device 120 extending therefrom. User input device 120 receives inputs from a user. The input device 120 can assume a wide variety of forms appropriate for actuation by a user's finger (e.g. by a finger other than the finger upon which the wearable electronic device is worn). For instance, the input device 120 can be mechanical, electro-mechanical, and/or sensor (e.g., a membrane sensor)-based, and in more general terms provides an actuation surface 122 for receiving a user-applied actuation force or action.

A user can actuate the input device 120 by engaging and/or applying a force to the actuation surface 122. The input device 120 may be configured to be positively actuated only upon the contact of a certain percentage of the actuation surface 122 or certain minimum pressure on a pressure sensor-type switch to avoid unintended activation. In some implementations, the input device 120 may be activated without substantial force or pressure being applied by the user. For example, the input device 120 could be a capacitive sensor which detects contact of a finger of the user, even when the user is not applying significant pressure.

The input device 120 may be any shape or size while still providing ample control for a user with a finger other than the finger upon which the device is worn. According to one or more implementations, the input device 120 can be sized and shaped to have the smallest size while still providing ample control for a user with a finger other than the finger upon which the device is worn.

An input can be provided to the wearable electronic device 100 by the user engaging input device 120. For instance, a user can engage the input device 120 when a finger of the user makes physical contact with input device 120 and actuates the input device 120. The input device 120 is communicatively coupled to a processor housed in the body 102. The physical actuation (e.g. manipulation) of the actuation surface 122 of the input device 120 is received and recognized by the processor (described below) of the device. In one or more implementations, the pressure of the engagement and/or manipulation of the actuation surface 122 is translated by the processor into a computer-readable form. The processor then compares the engagement and or manipulation of the actuation surface by the user to a plurality of stored manipulations based on the input. The input may be, for example, a tap, or a double-tap.

In one or more implementations, a user can use various contact patterns (e.g. different timings and/or intensities of detected contacts) to provide different inputs using the input device 120 of the wearable electronic device 100. Therefore, an input may be detected by the wearable electronic device 100 by the wearable electronic device 100 detecting a particular contact pattern. For example, an input may be provided by a user to the wearable electronic device 100 using a soft tap gesture (e.g. slightly depressing actuation surface 122 using a weak force event). As another example, an input may be provided by a user to the wearable electronic device 100 using a hard tap gesture (e.g. greatly depressing actuation surface 122 using a strong force event). Similarly, multi-soft tap and multi-hard tap gestures may be optionally detected by detecting a sequence of tap events by a user on actuation surface 122.

In one or more implementations, input device 120 may be a mechanical switch and include a depressible component (e.g. a button) that makes contact with a conductive element in response to a user applying a force to the button. Upon release of the force applied by the user, the button may thereafter return to a default position in response to an expansion of a spring or other biasing element. In one or more implementations, the input device 120 may be operated by sensing touch or proximity (e.g. by measuring capacitance of a user's finger).

More generally, any type of button is within the scope of the embodiments described herein, and input device 120 may include more than one button, where one button 122 may be a first type while another button 122 may be a second type.

Optical sensor 121 is arranged on an outer surface of the body 102. Optical sensor 121 is communicatively coupled to the processor and can capture an image in response to an input to the input device 120. Generally, the optical sensor 121 is positioned and oriented (e.g., on, within, along, or flush with the body 102 of the first wearable electronic device 100) to face the user when the input device 120 is oriented to face the user. In some implementations, the input to the input device 120 can be from a second finger of the user. Further, the optical sensor 121 is generally positioned and oriented (e.g., on, within, along, or flush with the body 102 of the first wearable electronic device 100) to face the user when a first finger of the user at least partially extends transversely across a field of view of the user. In some implementations, optical sensor 121 can be disposed on an outer surface of the body 102 at approximately 90 degrees circumferential rotation away from input device 120 such that the optical sensor 121 faces outward when the user's hand is closed into a fist, and such that the view of the optical sensor 121 is not obscured by the user's palm. In some implementations, this placement may be ideal for capturing pictures from the point of view of the user.

In one or more implementations, optical sensor 121 may include an autofocus camera. In these implementations, a power system (e.g. a power source) can be communicatively coupled to the autofocus camera to provide power to the autofocus camera.

Other actuation means (i.e., instead of the input device 120) are also within the scope of this description. For instance, other actuation mechanisms may include an input device on an electronic device in communication with the wearable electronic device 100 such as but not limited to another wearable device, a cellular phone, a laptop or tablet computer or the like. Other actuation mechanisms may also include mechanisms that do not require a mechanical input from a user. For instance, the actuation mechanism may be a response to a stimulus such as a human stimulus from the wearer of the wearable electronic device 100. In one or more implementations, the stimulus can be detected by the wearable electronic device 100 and in other embodiments the stimulus can be detected by another wearable electronic device that is in communication with the wearable electronic device 100. For example, in one embodiment, the actuation of the optical sensor 121 can be a response to eye tracking functionality of a pair of smart glasses that are in communication with the wearable electronic device 100 and worn by the user.

As shown in FIGS. 1A to 1D, in some implementations, the optical sensor 121 and the input device 120 extend outwardly from the outer surface 108 of body 102 in a direction towards first end 109. Specifically, a platform 124 extends away from aperture 104 in a direction towards first end 109 such that input device 120 and optical sensor 121 are presented on a presentation surface 126 of platform 124. In one or more implementations, presentation surface 126 can be substantially perpendicular to an axis passing through a central portion of aperture 104. Further, in one or more implementations, actuation surface 122 may be parallel to presentation surface 126.

A transmitter is also included in the first wearable electronic device 100 and is communicatively coupled to the processor, the transmitter to transmit the image to an external electronic device. The transmitter may include a wireless transmitter to wirelessly transmit the image to the external electronic device.

A power system (see FIG. 6) is also included in the first wearable electronic device 100. The power system generally provides electrical power to the various components of the wearable electronic device 100 (not all connections shown). For instance, in one or more implementations the power system (e.g. power source) is communicatively coupled to the processor and the transmitter to provide power to at least the processor and the transmitter. The power system optionally includes a power management system, one or more power sources (e.g., primary battery cells, secondary power cells, fuel cells, super- or ultra-capacitors), a recharging system, a power failure detection circuit, a power converter or inverter, a power status indicator (e.g., a light-emitting diode (LED)) and any other components associated with the generation, management and distribution of power in portable devices. The recharging system may receive wired power (from e.g. a micro-USB charger) or wireless power via receipt of electromagnetic waves by one or more inductors or inductive interfaces, and provide the electrical power to the one or more power sources via one or more wired or electrically conductive paths.

An indicator (not shown) may also be carried by the body 102 of the first wearable electronic device 100. The indicator may provide an indication when the optical sensor 121 captures an image. The indicator may be communicatively coupled to the power system (e.g. power source) and include at least one component selected from a group consisting of: a speaker, a light source, a sound generator, and a haptic feedback device.

In one or more implementations, first wearable device 100 may be worn on a left index finger or a left ring finger of a user. In this regard, platform 124 extends away from (e.g. radially outward from) aperture 104 in a direction towards first end 109 to present the optical sensor 121 and the input device 120 for the user to actuate with their left thumb. Other orientations and configurations of platform 124 extending from aperture 104 are possible to provide for wearable electronic device 100 to be worn on other fingers and other hands by the user.

Input device 120 can be sized and shaped to accommodate a finger of a user and arranged on a presentation surface 126 of the platform 124 to provide for a user to actuate the input device 120 without obstructing the optical sensor 121. For instance, in one or more implementations, input device 120 and optical sensor 121 may both be carried by (e.g., positioned on, within, along, or flush with) the presentation surface 126 of the platform 124. In one or more implementations, the input device 120 and the optical sensor 121 may be separated by a spacing 128 to provide for a user to actuate the input device 120 without obstructing the optical sensor 121. As shown in the Figures, input device 120 can be arranged to be below optical sensor 121 on presentation surface 126, but can also be arranged to be beside or above optical sensor 121 so long as the input device 120 can be actuated by a finger of the user without obstructing the optical sensor 121. In one or more implementations, the presentation surface 126 can generally be parallel to or coplanar with a plane tangent to the body 102 of the wearable electronic device 101. In other implementations, the optical sensor 121 can be coplanar with the presentation surface 126.

Presentation surface 126 can be sized and shaped to present the optical sensor 121 and the input device 120 in any manner that also provides for the user to actuate the input device 120 without obstructing the optical sensor 121. For instance, as shown in the FIGS. 2A to 2D, the presentation surface 126 may include an upper presentation portion 130 and a lower presentation portion 132. Each of upper presentation portion 130 and lower presentation portion 132 extend from the aperture 104 via platform 124. Further, each of upper presentation portion 130 and lower presentation portion 132 can present one of input device 120 and optical sensor 121 to the user. In one or more implementations, upper presentation portion 130 can present optical sensor 121 to the user and lower presentation portion 132 can present input device 120 to the user. Lower presentation portion 132 can be perpendicular to an axis passing through the central portion of the aperture 104, and can be slopped downwardly relative to upper presentation portion 130 to provide for a user to more easily actuate the input device 120 with their thumb when wearing the first wearable electronic device 100.

In one or more implementations, the presentation surface 126 may include an edge 127 that separates the presentation surface 126 into the upper presentation portion 130 and lower presentation portion 132.

In other embodiments, such as the embodiment shown in FIGS. 3A to 3E and 4A to 4E, one of the upper presentation portion 130 and lower presentation portion 132 can be angled laterally (e.g. side-to-side, at a non-zero angle) with respect to the other of the upper presentation portion 130 and the lower presentation portion 132 towards either of first side 105 or second side 107. Angling either of the upper presentation portion 130 or the lower presentation portion 132 to either provide input device 120 to be more easily actuated or to provide for optical sensor 121 to be more easily aimed toward a part of (i.e. a face of) the user.

Specifically, referring FIGS. 3A to 3E, illustrated therein is an embodiment of wearable electronic device 100 where upper presentation portion 130 presents optical sensor 121 and is angled laterally at a non-zero angle with respect to lower presentation portion 132 presentation input device 120 towards first side 105.

Conversely, referring to FIGS. 4A to 4E, illustrated therein is an embodiment of wearable electronic device 100 where upper presentation portion 130 presents optical sensor 121 and is angled laterally at a non-zero angle with respect to lower presentation portion 132 to present input device 120 towards second side 107.

It should be noted that lower presentation portion 132 can also be angled laterally at a non-zero angle with respect to upper presentation portion 130 towards either of first side 105 and second side 107.

Referring now to FIGS. 5A to 5E, illustrated therein is an embodiment of the first wearable electronic device 100 where upper presentation portion 130 extends from or is carried by a protrusion 136 of platform 124. Protrusion 136 can extend outward from the platform 124 to further provide for the upper presentation portion 130 and/or the optical sensor 121 thereon to be easily aimed toward a part (e.g. a face) of the user for capturing an image of the part (e.g. face) of the user. In one or more implementations, when the upper presentation portion 130 is carried on protrusion 136 and optical sensor 121 is carried by (e.g., positioned on, within, along, or flush with) protrusion 136, optical sensor 121 can extend radially beyond the input device 120. In the embodiment shown in FIGS. 5A to 5E, the protrusion 136 extends a distance D beyond the platform 124 in a direction towards the first end 109 to provide for the user to capture an image of a part of themselves. For instance, the protrusion 136 can provide for the upper presentation portion 130 to be perpendicular with the axis passing through the central portion of the aperture 104, or, as shown in the embodiment shown in FIGS. 5A to 5E, the protrusion 136 can provide for the upper presentation portion 130 to be sloped relative to lower presentation portion 132 in a direction towards one of first side 105 and second side 107. In this manner, upper presentation portion 130 can extend beyond lower presentation portion 132 and be sloped relative to lower presentation portion 132 in a direction towards one of first side 105 and second side 107.

Figure 6:
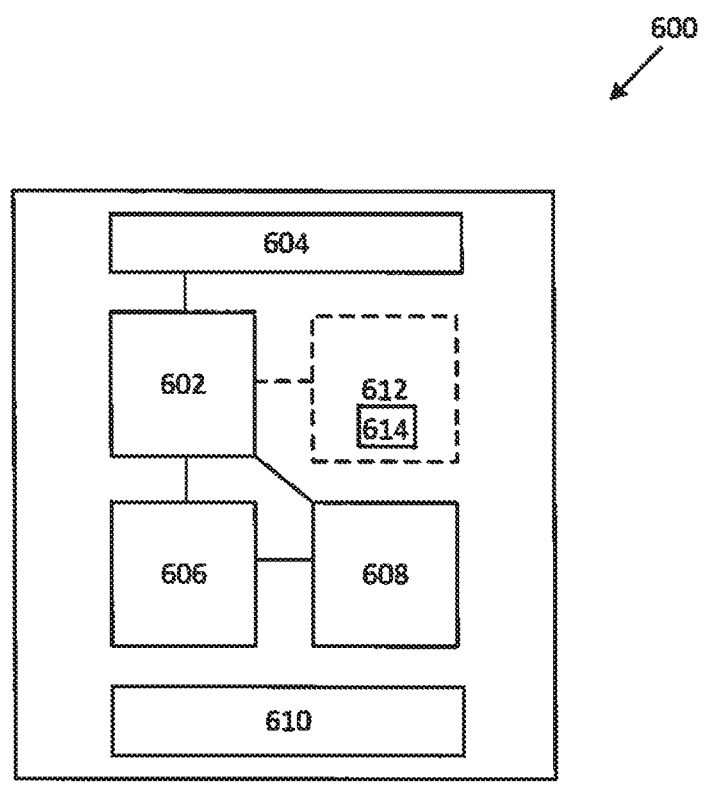
FIG. 6 is a block diagram illustrating a wearable electronic device, according to one embodiment.

FIG. 6 is a block diagram illustrating a wearable electronic device 600 with a removable control module in accordance with one or more implementations. Device 600 includes memory 602 that optionally includes one or more computer readable storage mediums, one or more processing units (CPUs) 604, RF circuitry 606, an input/output (I/O) subsystem 608 and a power system 610. Wearable electronic device 600 optionally includes one or more sensors 612.

Memory 602 optionally includes high-speed random access memory and optionally also includes non-volatile memory, such as one or more magnetic disk storage devices, flash memory devices, or other non-volatile solid-state memory devices. Access to memory 602 by other components of wearable electronic device 600, such as CPU(s) 604 is, optionally, controlled by a memory controller (not shown).

The one or more processors 604 run or execute various software programs and/or sets of instructions stored in memory 602 to perform various functions for wearable electronic device 600 and to process data.

RF (radio frequency) circuitry 606 receives and sends RF signals, also called electromagnetic signals. RF circuitry 606 converts electrical signals to/from electromagnetic signals and communicates with communications networks and other communications devices via the electromagnetic signals. RF circuitry 606 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 606 optionally communicates with networks, such as the Internet, an intranet and/or a wireless network, such as a cellular telephone network, a wireless local area network (LAN) and/or a metropolitan area network (MAN), and other devices by wireless communication.

I/O subsystem 608 couples input/output peripherals of wearable electronic device 600, such as input device 120 and other input or control devices, with a peripherals interface (not shown). I/O subsystem 608 includes a controller for the input device 120.

Power system 610 is generally for powering the various components of the wearable electronic device 600. Power system 610 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The recharging system may be configured to receive wired power (from, e.g., a micro-USB charger) or wireless power transmitted via electromagnetic waves and to provide the wired power to the one or more power sources.

In conjunction with input device 120 and optical sensor 121, an optical sensor controller 612 having a camera module 614 includes executable instructions to capture still images or video (including a video stream) and store them into memory 602.

Wearable electronic device 600 optionally also includes one or more accelerometers, gyroscopes, and/or magnetometers (e.g., as part of an inertial measurement unit (IMU)) vibration, shock, impact, and any other appropriate inertial sensors (herein referred to as impact sensors) for obtaining information concerning the position (e.g., attitude) acceleration, orientation, angular velocity, and/or vibration of the wearable electronic device. In one or more implementations, these sensors can be coupled with a peripherals interface (not shown)

It should be appreciated that wearable electronic device 600 is only one example of a wearable electronic device, and that wearable electronic device 600 optionally has more or fewer components than shown, optionally combines two or more components, or optionally has a different configuration or arrangement of the components. The various components shown in FIG. 6 are implemented in hardware, software, firmware, or a combination thereof, including one or more signal processing and/or application specific integrated circuits.

Figure 7:
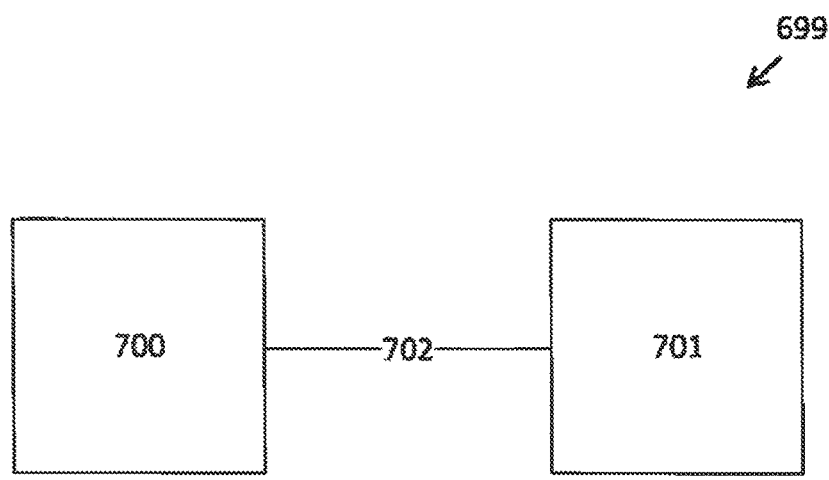
FIG. 7 is a block diagram illustrating a wearable electronic device communicating with an external electronic device, according to one embodiment.

FIG. 7 is a block diagram illustrating a system 699 of a first wearable electronic device 700 and a second wearable electronic device 701 in accordance with one or more implementations described herein. Second wearable electronic device 701 may include a display screen displaying a user interface for viewing by the user of the first wearable electronic device 700.

Second wearable electronic device 701 may be any wearable electronic device capable of being controlled by the first wearable electronic device 700 according to one or more implementations described herein. For example, the second wearable electronic device 701 may be a wearable heads-up display to be worn on a head of a user, wherein the wearable heads-up display that includes at least one transparent display positioned in a field of view of the user when the wearable heads-up display is worn on the head of the user. The second wearable electronic device 701 may also include a wireless receiver and a processor communicatively coupled to both the at least one transparent display and the wireless receiver. In one or more implementations, second wearable electronic device 701 may include a display screen displaying a user interface for viewing by the user of the wearable electronic device 700.

First wearable electronic device 700 communicates with second wearable electronic device 701 via a communications channel, for instance a communication network 702, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the second wearable electronic device 701 and the first wearable electronic device 700.

According to at least one implementation, the first wearable electronic device 700 can be an electronic ring according to any one or more of the implementations described above, and the second wearable electronic device 701 can be a wearable heads-up display to be worn on a head of a user. Optionally, the system 699 can also include a connecting case (not shown) for the wearable electronic devices. An example of a similar system is described in US Patent Application Publication 2017-0097753, and US Patent Application Publication 2018-0067621.

Figures 8A, 8B, 8C:
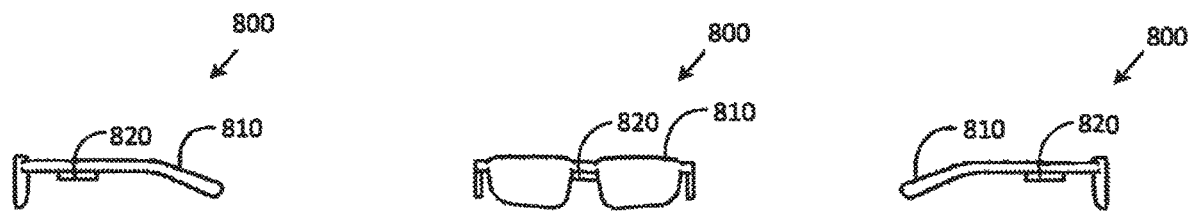
FIGS. 8A to 8C are left side, front and right side views of a second wearable electronic device, according to one embodiment.

One implementation of a wearable heads-up display 701 is shown as glasses 800 in FIGS. 8A to 8C. The glasses 800 can include a frame 820 holding a pair of lenses 810. The frame 820 may include a bridge between the lenses, as well as a right arm and a left arm. The shape of the glasses is shown for illustrative purposes and is not limited to the illustrated shape. Other shapes can be used. Furthermore, other head mounted electronic display units 701 can be used. For example, a head mounted electronic display unit 701 may cover a portion of the user's head, such as a helmet, may rest on top of a user's head, and/or wrap around a user's head, such as a headband. A head mounted electronic display unit 701 may further include fastening or elastic members to secure to the user's head.

In at least one implementation of system 699, the wearable electronic ring 700 is sized and shaped to be worn on a first finger of the user. The wearable electronic ring 700 includes an actuator to be actuated by a second finger of the user when the wearable electronic ring 700 is worn on the first finger of the user, an autofocus camera communicatively coupled to the actuator, the autofocus camera positioned and oriented (e.g., on, within, along, or flush with the wearable electronic ring 700) to capture a selfie image of the user in response to an actuation of the actuator by the second finger; and a wireless transmitter communicatively coupled to the autofocus camera.

In at least one implementation of system 699, the wearable heads-up display 701 includes at least one transparent display positioned in a field of view of the user when the wearable heads-up display is worn on the head of the user, a wireless receiver; and a processor communicatively coupled to both the at least one transparent display and the wireless receiver.

In at least one implementation of system 699, the wearable electronic ring 700 can include a processor that mediates communicative coupling between the autofocus camera and the actuator and between the autofocus camera and the wireless transmitter. The processor can process the selfie image captured by the autofocus camera and cause the wireless transmitter to wirelessly transmit the selfie image to the wireless receiver of the wearable heads-up display 701.

In at least one implementation of system 699, the wearable heads-up display 701 can include a non-transitory processor-readable medium that stores processor-executable instructions that, when executed by the processor of the wearable heads-up display 701, cause the at least one transparent display to display the selfie image to the user.

Throughout this specification and the appended claims, the term "carried by" is generally used to describe an arrangement in which there is physical coupling between components and/or elements of components, but that physical coupling may be manifested in a range of different ways. For example, for a component (e.g., an optical sensor) to be "carried by" a surface (e.g., an outer surface of a body of a wearable electronic device), the component must physically couple to the surface in some way and that physical coupling may include the component being positioned on the surface, the component being positioned within the surface (e.g., so that the component is flush with the surface), the component being positioned partially within the surface (e.g., so that the component protrudes from the surface), the component being recessed within the surface, or generally, the component being positioned "along" the surface. Unless the specific context requires otherwise, the term "carried by" is not intended to denote a particular configuration with respect to on or within, nor a particular orientation with respect to top and bottom, up and down, and/or left and right.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the to the following are incorporated herein by reference in their entirety: U.S. Provisional Patent Application 62/667,300, U.S. Provisional Patent Application 62/607,819, US Non-Provisional patent application Ser. No. 16/226,319, U.S. Non-Provisional patent application Ser. No. 16/226,326, U.S. Non-Provisional patent application Ser. No. 16/226,330, U.S. Non-Provisional patent application Ser. No. 16/226,422, U.S. Non-Provisional patent application Ser. No. 16/226,426, U.S. Provisional Patent Application 62/608,463, U.S. Non-Provisional patent application Ser. No. 16/227,347, US Patent Application Publication 2017-0097753, and US Patent Application Publication 2018-0067621. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic device wearable on a first finger of a user, the wearable electronic device comprising:
   a body defining an aperture therethrough, the aperture to receive the first finger of the user;
   a processor housed in the body;
   an input device carried by an outer surface of the body and communicatively coupled to the processor, the input device to receive an input from a second finger of the user;
   an optical sensor carried by the outer surface of the body and communicatively coupled to the processor, the optical sensor to capture an image in response to the input from the second finger of the user; and
   a transmitter communicatively coupled to the processor, the transmitter to transmit the image to an external electronic device, wherein the body comprises a platform having a presentation surface to present the input device and the optical sensor to the user, wherein both the input device and the optical sensor are carried by the presentation surface of the platform, and wherein the presentation surface comprises an edge that separates the presentation surface into an upper presentation portion and a lower presentation portion.

2. The wearable electronic device of claim 1 wherein the presentation surface is generally parallel to or coplanar with a plane tangent to the body of the wearable electronic device.

3. The wearable electronic device of claim 1 wherein the platform extends radially outward from the aperture of the body.

4. The wearable electronic device of claim 1 wherein the optical sensor is coplanar with the presentation surface.

5. The wearable electronic device of claim 1 wherein the input device extends outward from the presentation surface and has an actuation surface that is parallel to the presentation surface.

6. The wearable electronic device of claim 1 wherein the optical sensor is carried by the upper presentation portion and the upper presentation portion presents the optical sensor to the user, and wherein the input device is carried by the lower presentation portion and the lower presentation portion presents the input device to the user.

7. The wearable electronic device of claim 6 wherein the lower presentation portion is angled at a non-zero angle relative to the upper presentation portion.

8. The wearable electronic device of claim 6 wherein the upper presentation portion is sloped laterally towards a side of the body.

9. The wearable electronic device of claim 6 wherein the upper presentation portion is carried by a protrusion that extends outward from the platform, wherein the optical sensor is carried by the protrusion.

10. The wearable electronic device of claim 9 wherein the optical sensor extends beyond the input device.

11. The wearable electronic device of claim 9 wherein the upper presentation portion is sloped laterally towards a side of the body.

12. The wearable electronic device of claim 1 wherein the optical sensor includes an autofocus camera.

13. The wearable electronic device of claim 1 wherein the input device is selected from a group consisting of: a button, a joystick, a capacitive touch sensor, a lever, and a dial.

14. The wearable electronic device of claim 1 wherein the optical sensor is positioned and oriented to face the user when the input device is oriented to face the user.

15. The wearable electronic device of claim 1, further comprising an indicator carried by the body, the indicator to provide an indication when the optical sensor captures the image, wherein the indicator includes at least one component selected from a group consisting of: a speaker, a light source, a sound generator, and a haptic feedback device.

* * * * *